Patented Feb. 6, 1951

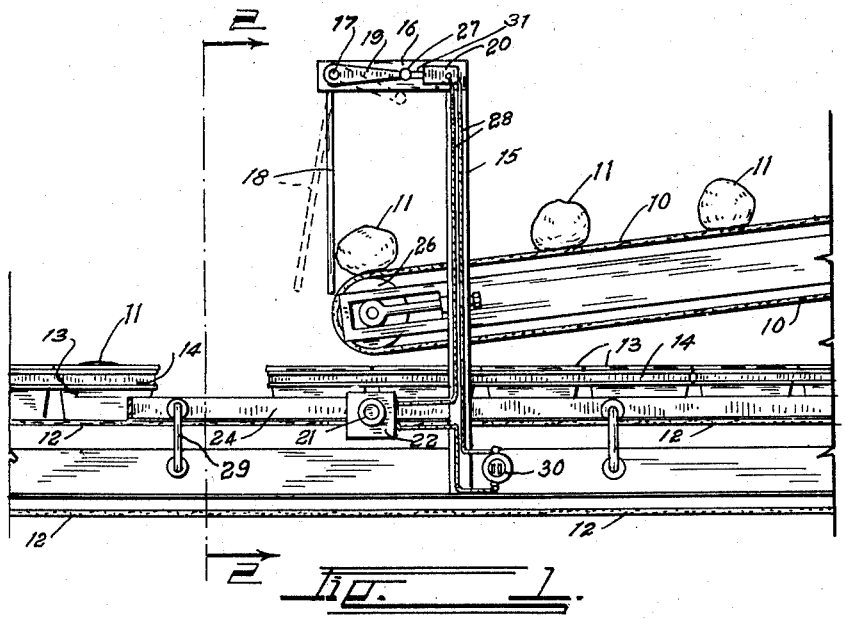
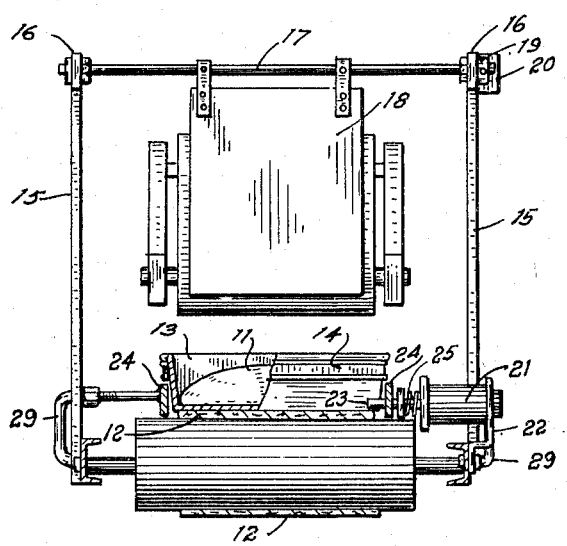

2,540,945

UNITED STATES PATENT OFFICE 2,540,945

DEVICE FOR SUCCESSIVELY FILLING INDIVIDUAL CONTAINERS BY MEANS OF A CONTAINER-INTERCEPTING PLUNGER

Frank M. Hart, Denver, Colo.

Application April 26, 1948, Serial No. 23,354

3 Claims. (Cl. 226—2)

This invention relates to a bread pan feeding control for bakeries, and has for its principal object the provision of a simple and highly efficient mechanism which will successively move bread pans into position to receive the loaf dough.

Another object of this invention is to provide a device of this character which can be quickly and easily applied to the present dough and pan conveyors used in bakeries.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side view illustrating the invention applied to conventional bakery conveyors; and Fig. 2 is a cross-section, taken on the line 2—2, Fig. 1.

In the drawing, a conventional endless belt dough conveyor is indicated at 10 running round a terminal roller 26, with the loaves of dough thereon at 11. An endless belt type pan conveyor is illustrated at 12. The bread pans are indicated at 13, and in the usual bakery the pans are tied together in sets of four by means of tie straps 14.

In the usual construction, the pans 13 travel forwardly beneath the dough conveyor 10, and the loaves of dough drop from the conveyor 10 into the forwardly traveling pans. It is difficult, however, to space the dough on the conveyor 10 properly so that each loaf of dough will drop accurately into one of the pans. Therefore, it has been necessary heretofore to keep an operator at this point to see that the pans are properly filled.

This invention is designed to eliminate the need of an operator, and to move the pans forwardly in exact position to receive each loaf of dough, regardless of the position or spacing of the loaves on the conveyor 10.

The invention is supported on a vertical framework 15 secured at its bottom to the frame of the pan conveyor 12 and extending upwardly thereover. Two bracket arms 16 extend forwardly from the framework 15 and support a rotatable, horizontal hinge shaft 17 immediately over the discharge extremity of the conveyor 10.

A swinging plate 18 depends from the shaft 17 into the path of the dough loaves 11 as they discharge from the conveyor 10 so that, as each dough loaf 11 passes over the terminal roller 26 of the conveyor 10, it will swing the plate 18 to the dotted line position of Fig. 1.

A switch operating arm 19 is fixedly mounted on one extremity of the hinge shaft 17 and terminates in a roller 27. A push type switch 20, such as used on doors to open a circuit when a door is closed and having a plunger 31 which when depressed opens the circuit of the switch 20. The plunger 31 is mounted in the path of the roller 27 so that the latter will roll against the plunger to open the switch. The switch 20 is in circuit through conductors 28 with a solenoid 21 mounted in a mounting bracket 22 on the side of the conveyor 12. The conductors 28 terminate in a connection plug 30 by means of which they may be connected to any available source of electricity.

The solenoid actuates an armature plunger 23 which, when extended, extends between the adjacent pans 13 and prevents their movement with the conveyor 12. The sets of four pans each are prevented from rotating or turning on the conveyor by means of side guide bars 24 extending along both sides of the conveyor 12. The bars 24 are supported in adjustable mounting brackets 29 from the frame of the conveyor 12.

The plunger 23 is constantly urged outwardly to stop the pans 13 by means of a spring 25, and is withdrawn into the solenoid 21 out of the path of the pans by electrically energizing the solenoid through the switch 20.

Therefore, as each dough loaf 11 begins to roll over the terminal roller 26 of the conveyor 10, it will swing the plate 18 as shown in broken line. This swings the roller 27, out of contact with the plunger 31 of the switch 20 to close the circuit to the solenoid 22. This causes the solenoid to snap the armature plunger 23 out of the path of the pans, allowing the next successive pan to move up to receive the falling dough loaf.

As soon as the dough has left the plate 18, the latter swings back to roll the roller 27 against the switch plunger 31 to break the circuit, allowing the spring 25 to force the armature forwardly to engage the next empty pan and stop it below the falling dough. The conveyor 12 slides beneath the pans when the latter are held stationary by the plunger 21. As soon as the fourth pan of a set has been filled, the entire set of four pans is released and travels along the conveyor 12.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for moving bread pans successively beneath falling loaves of dough, comprising a conveyor frame; an endless belt pan conveyor supported in said frame; side guides on said conveyor; a series of bread pans positioned on said pan conveyor between said side guides; an armature plunger resiliently urged into the path of said pans to successively engage the latter and hold them stationary while said conveyor moves therebeneath; a solenoid arranged when energized to withdraw said armature plunger from the path of said pans; a second endless belt conveyor terminating above the pans on the first conveyor and adapted to carry dough loaves; a fixed frame secured to said conveyor frame and extending above the discharge extremity of said endless belt conveyor; a horizontal shaft supported by said frame over the discharge extremity of the second conveyor; a swinging plate depending from said shaft into the path of the dough loaves discharging from said second conveyor; and switch means actuated by said swinging plate; said switch means being in circuit with said solenoid to energize the latter each time said plate is swung by contact with a dough loaf.

2. In a bread pan filling device of the type having a substantially horizontal dough loaf conveyor positioned in alignment with and terminating over a bread pan conveyor, means for holding each successive pan stationary on said pan conveyor as a dough loaf falls from said dough loaf conveyor, comprising: a vertical frame member secured to the support of the pan conveyor at each side of the latter and extending upward at each side of the discharge extremity of said dough loaf conveyor; a rotatable, horizontal hinge shaft extending between said frame members over said discharge extremity; a freely swinging plate secured to and depending vertically from said shaft into the horizontal path of the dough loaves at said discharge extremity; a switch operating arm fixed to one extremity of said shaft; a normally closed switch positioned adjacent said arm; an actuator projecting from said switch for opening the latter when depressed, said actuator extending into the path of said switch operating arm and being positioned so that when said swinging plate is in a vertical position, said arm will hold said actuator depressed and said switch open, and when said plate is swung from the vertical position, said actuator will be released to close said switch; side guides on said pan conveyor preventing lateral movement of the pans thereon; a spring-actuated plunger extending through one of said side guides below said discharge extremity to engage and hold a pan therebelow; and a solenoid positioned to act upon said spring-actuated plunger to withdraw the latter from engagement with said pans to allow the latter to move with said pan conveyor, said solenoid being in circuit with said switch so that swinging of said plate will actuate said solenoid.

3. The combination with a dough conveyor delivering dough loaves to a pan conveyor carrying bread pans, of a plunger adapted to successively engage said pans and hold them stationary beneath the discharge of the dough conveyor; a solenoid acting directly upon said plunger so that when energized it will instantly and magnetically withdraw said plunger from the path of said pans; a swinging plate suspended in the path of the dough loaves as they discharge from the dough conveyor; and circuit-closing means actuated by the swinging of said plate, said circuit-closing means being in circuit with said solenoid so that the latter will be energized each time said plate is swung by the discharging dough.

FRANK M. HART.

REFERENCES CITED

The following references are of record in the file of this patent:

UNITED STATES PATENTS

| Number | Name | Date |
|---|---|---|
| 1,357,476 | Rogers et al. | Nov. 2, 1920 |
| 2,337,526 | Steadman et al. | Dec. 21, 1943 |
| 2,390,195 | Tascher | Dec. 4, 1945 |
| 2,438,811 | Le Sage | Mar. 30, 1948 |